United States Patent [19]

Ishida

[11] Patent Number: 5,495,293
[45] Date of Patent: Feb. 27, 1996

[54] FRAME SYNCHRONIZER AND A SIGNAL SWITCHING APPARATUS

[75] Inventor: Masayuki Ishida, Yokohama, Japan

[73] Assignee: Nippon Television Network Corp., Tokyo, Japan

[21] Appl. No.: 305,264

[22] Filed: Sep. 13, 1994

[30] Foreign Application Priority Data

Dec. 16, 1993 [JP] Japan .................................. 5-317060

[51] Int. Cl.⁶ ..................................................... H04N 7/01
[52] U.S. Cl. .......................... 348/500; 348/519; 348/913; 348/474; 348/705
[58] Field of Search ...................................... 348/512, 513, 348/514, 516, 57, 518, 519, 520, 913, 721, 473, 474, 476, 432, 434, 705, 556

[56] References Cited

U.S. PATENT DOCUMENTS

| 4,912,549 | 3/1990 | Altman et al. ...................... 348/512 X |
| 5,294,983 | 3/1994 | Ersoz et al. .............................. 348/521 |

FOREIGN PATENT DOCUMENTS

| 4039307 | 4/1992 | Germany . |
| 89/05555 | 6/1989 | WIPO . |
| 91/19395 | 12/1991 | WIPO . |

*Primary Examiner*—Victor R. Kostak
*Assistant Examiner*—Nathan J. Flynn
*Attorney, Agent, or Firm*—Smith-Hill and Bedell

[57] ABSTRACT

An external color frame is synchronized with a local color frame without producing a pixel position error. A frame synchronizer synchronizes a frame from an external television signal with that of a local television signal. A wide screen oriented high definition television signal is used as the external television signal, the image quality of which is improved by adding a support signal to the main screen signal. A memory is provided to receive and store the external television signal and the external signal is read from the memory after a predetermined time passes when the frame difference between the external and local television signals is at least one frame. In this instance, only the support signal in the readout of the external television signal is corrected by a low pass filter in order to match the pixel position of the support signal to that of the main screen signal.

26 Claims, 6 Drawing Sheets

FIG. 8A SUPPORT SIGNAL

| 1 | ② | 3 | 4 | ⑤ | 6 | 7 | ⑧ | 9 | 10 | ⑪ |

FIG. 8B DATA COMPRESSED SUPPORT SIGNAL

| 2 | 5 | 8 | 11 |

FIG. 8C CORRECTLY RESTORED SUPPORT SIGNAL

| 1 | 2 | 3 | 4 | 5 | 6 | 7 | 8 | 9 | 10 | 11 |

FIG. 8D COMPRESSED SUPPORT SIGNAL AFTER TWO-PIXEL SHIFT

| x | x | 2 | 5 | 8 | 11 |

FIG. 8E WRONG RESTORED SUPPORT SIGNAL

| 1 | 2 | 3 | 4 | 5 | 6 | 7 | 8 |

FIG. 8F SUPPORT SIGNAL CORRECTLY RESTORED FROM (D)

| x | x | 1 | 2 | 3 | 4 | 5 | 6 | 7 | 8 | 9 |

FIG. 8G ORIGINAL COMPRESSED SUPPORT SIGNAL OF (F)

| 0 | 3 | 6 | 9 |

FRAME SYNCHRONIZER AND A SIGNAL SWITCHING APPARATUS

BACKGROUND OF THE INVENTION

The present invention relates to a frame synchronizer and the switching apparatus that utilizes said frame synchronizer. This invention is appropriate for a wide screen oriented high definition external television signal, such as the next generation Enhanced Definition Television (EDTV), e.g., EDTV-II, when such external television signal is to be frame synchronized with a local television signal.

Since broadcast television cameras in local stations are driven such that color frames thereof are synchronized with each other, no problem occurs with the frame synchronization. In order to switch between the local television signal and a television signal transmitted from outside the local station, a signal switching apparatus must be used in connection with the frame synchronization.

Figure 5:
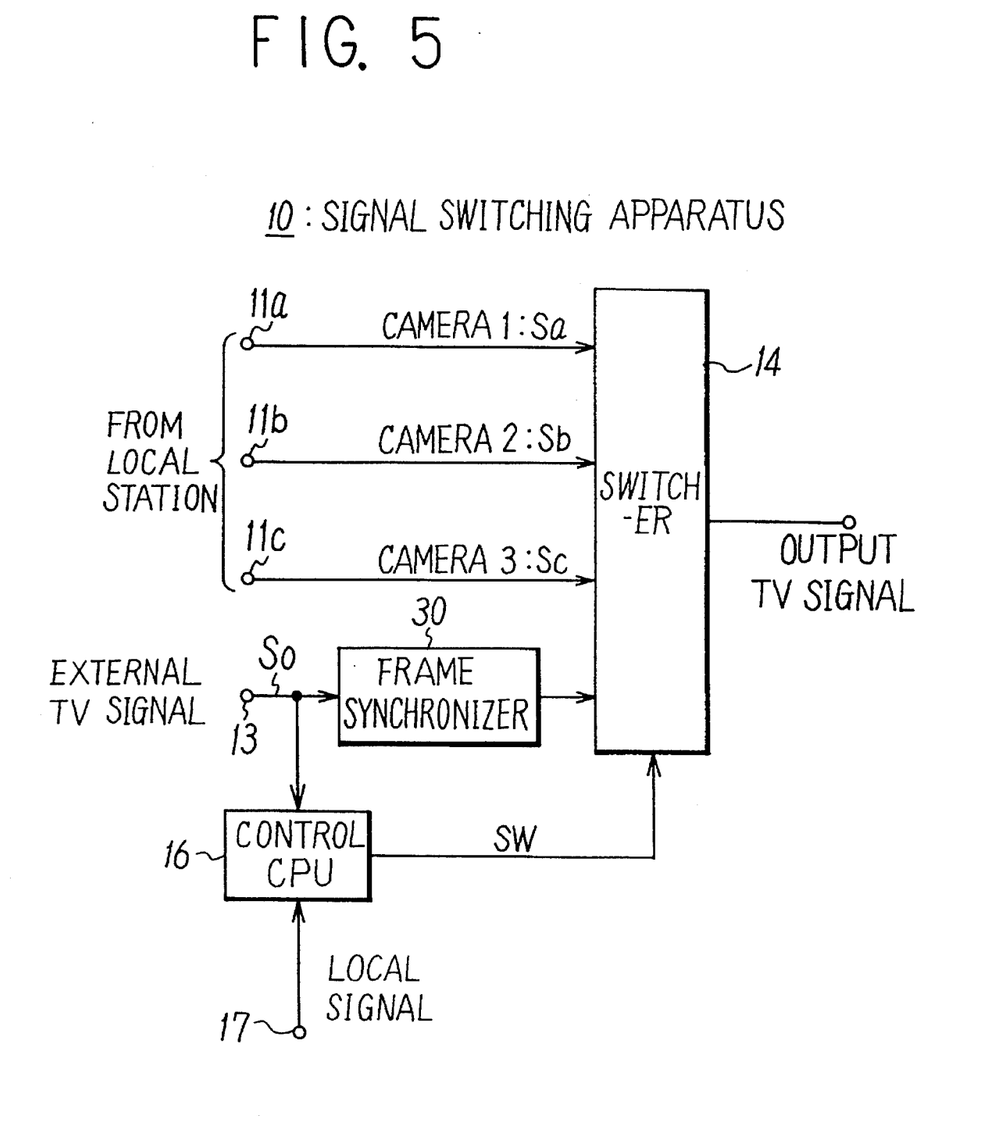
FIG. 5 is a block diagram of one example of the signal switching apparatus used in a local station.

FIG. 5 shows an example of the signal switching apparatus 10. Input terminals 11a–11c receive, for example, local television signals Sa–Sc from three television cameras at the local station. These local television signals are applied to a switcher 14.

An input terminal 13 receives a television signal from outside the local station, i.e., an external signal transmitted through a variety of transmission systems. The television signal from outside the local station (hereinafter referred to as "external television signal") may be a reproduced signal of a VTR that is not synchronized with the television camera.

External television signals are not synchronized with local television signals in general, so a frame synchronizer (FS) 30 is commonly provided between the input terminal 13 and the switcher 14 in order to make the external signal synchronized with the local signal. The output signal from the frame synchronizer is thus applied to the switcher 14 so that the output signal is synchronized with the local television signal. A control central processing unit (CPU) 16 is a control section that applies a read/write signal to the frame synchronizer 30 and applies a switching signal SW to the switcher 14 to control the selection of a target television signal from the four input signals. The control CPU 16 receives an external color frame signal and the like from terminals 13 and 17.

Since a color subcarrier phase returns to the original phase position every four fields in the NTSC system, a color video signal may be delayed so as to match the color frame phases of independent video signals every four fields. This results in a large time difference between the video signal and an audio signal. In a synchronous relay of the broadcasting of a connection between the local station and an outside station, the time difference between the audio and video signals is conspicuous and viewers may feel uncomfortable.

In consideration of the above discussed points, a conventional frame synchronizer 30 delays the video signal for two fields and shifts it by two pixels. Thus, the frame synchronizer can reduce the incompatibility at the synchronous relay and can synchronize the external television signal with the local one. In this instance, a minimum delay value may be applied to the video signal.

The above discussed case is an example of a color video signal being digitized with a clock frequency of 4 fsc (fsc is a color subcarrier frequency). It takes four pixel periods for the color phase to return to its original phase position in the 4 fsc digitizing operation. Thus, if the video signal is delayed by two fields, the color phase may be shifted by one hundred and eighty degrees. When the color phase is shifted by one hundred and eighty degrees and further shifted by two pixel periods (corresponding to one hundred and eighty degrees), only a two-field delay process of the external television signal will cause the color phase of the external signal to match the local color phase.

For the foregoing operation, the frame synchronizer 30 writes the digitized television signal with a write clock WCK that is synchronized with the external television signal and reads the stored signal with a read clock that is synchronized with the local television signal. In this instance, the above discussed readout timing is maintained.

Such a frame synchronization process cannot be applied to all television signals. Especially when the high definition oriented television signal is used as the external television signal, the above described conventional process cannot be applied to such a signal without modification.

The television broadcasting signal currently used is an interlacing signal. The EDTV signal which has 525 scanning lines per field (for the NTSC system) is known as one of the high definition television signals that maintains compatibility with the interlacing signal.

In the EDTV system, a high-vision broadcasting system is being proposed for a wide screen oriented television system (what is called the next generation EDTV system, i.e., EDTV-II).

The screen aspect ratio of the high-vision broadcasting system is 16:9. The EDTV-II system has the same aspect ratio. Since the EDTV-II system is oriented to high definition while maintaining compatibility with the present television system, the television signal of the EDTV-II system can be applied to the screen of the current aspect ratio (4:3) by selecting a signal type. For example, a letter box type signal is appropriate for maintaining compatibility when the upper and lower parts of the screen are blank areas that include no information.

Figure 6:
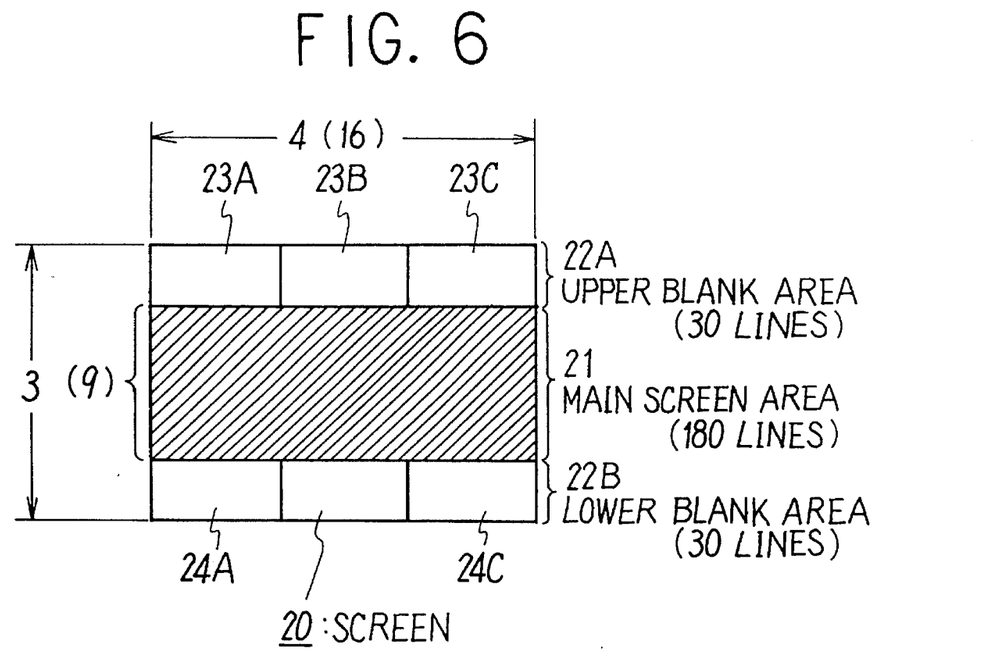
FIG. 6 is a diagram of an EDTV-II type signal configuration.

FIG. 6 shows a screen configuration in which the EDTV-II video signal is displayed on a conventional screen 20 having the present aspect ratio (4:3). The main screen area 21 is positioned at the center of the screen. When the video image of the EDTV-II system is displayed on the screen 20 having the current aspect ratio, the image in the main screen area 21 corresponds to the EDTV-II video image.

The screen 20 includes portions above and below the main screen area 21 called the upper blank area 22A and the lower blank area 22B which contain no information. These blank portions are processed as non-information areas (actually a gray that is almost black) so that the compatibility can be maintained with a video system having the current aspect ratio.

A video signal for the upper and lower blank areas 22A and 22B is called a support (reinforcement) signal that is used in the high definition mode. This signal may be a horizontal high-band signal or a vertical high-band signal.

The main screen area 21 consists of one hundred and eighty horizontal lines and each of the upper and lower blank areas 22A and 22B consists of thirty horizontal lines. Since the support signal in the video signal for the main screen area should be assigned to the sixty horizontal lines comprising the upper and lower blank areas, the support signal is compressed one third and is inserted into the upper and lower blank areas 22A and 22B.

Figure 7:
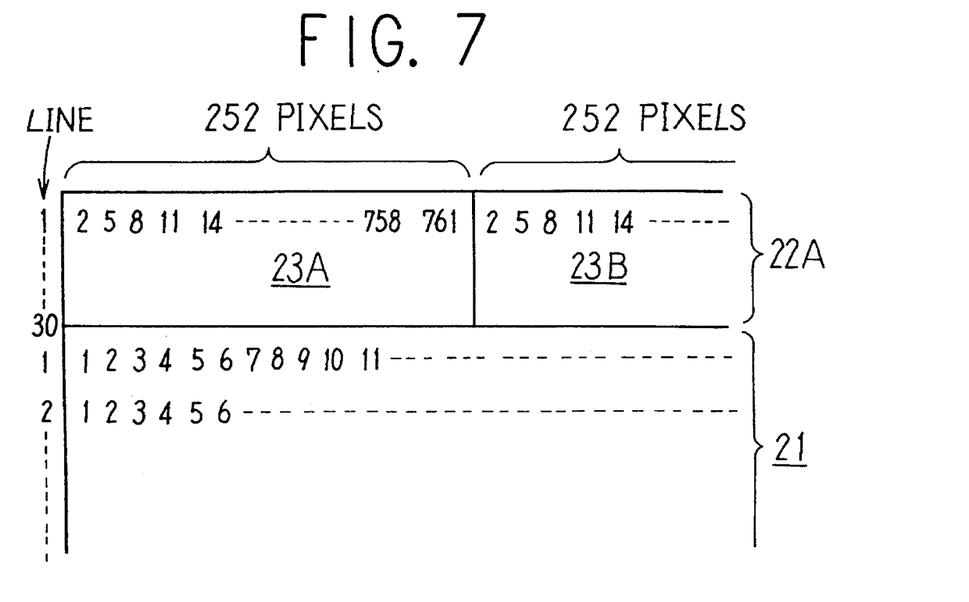
FIG. 7 is a diagram explaining the relationship between the main screen image data and the compressed data in the upper blank area.

In FIG. 6, each of the upper and lower blank areas 22A and 22B is divided by three horizontally. For example, the support signal for the upper ninety horizontal lines in the main screen area 21 is inserted into the upper blank area 22A. As shown in FIG. 7, the support signal (compressed image data) for the first to thirtieth horizontal lines in the main screen area is inserted into the divided area 23A, the support signal for the thirty-first to sixtieth horizontal lines in the main screen area is inserted into the divided area 23B, and the support signal for the sixty-first to ninetieth horizontal lines in the main screen area is inserted into the divided area 23C in order to form the upper blank area 22A. For the lower blank area 22B, the support signal for the lower ninety horizontal lines in the main screen area is processed in a fashion similar to the support signal for the upper blank area.

If reference numbers representative of pixel positions of the main screen signal are used to indicate the pixel positions of the corresponding support signal, the horizontal pixel position in the main screen area 21 does not match that of the support signal that is to be inserted into the divided area in the upper blank area 22A as shown in FIG. 7. This is due to the compression process of the support signal and the scattering insertion process for the divided areas as previously discussed.

Since the pixel positions of the upper blank area and the main screen area do not match, a pixel relationship between the main screen signal and the support signal cannot be maintained when the external television signal is processed in the frame synchronization operation which synchronizes the external color frame with the local color frame, especially when the two-pixel shift process is performed.

Figure 8A:
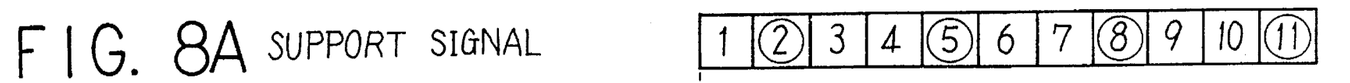
FIG. 8 is a data diagram explaining the restoring of the support signal after shifting the signal by two pixels.

FIG. 8 shows a data diagram explaining the above discussed process wherein FIG. 8A represents the pixel position of the support signal. When this support signal is compressed one third, the compressed signal becomes the signal shown in FIG. 8B. When this compressed support signal is decoded (processed by extending it), the original support signal is restored as shown in FIG. 8C. A predetermined signal process is accomplished by, e.g., applying the restored support signal to the main screen signal, thereby reproducing the high definition video.

The two-pixel shift process is necessary for the frame synchronization as previously described. This two-pixel shift process is equivalent to a special readout process wherein a meaningless signal (represented by "x") is the output for two pixels and the actual compressed support signal is the output shown in FIG. 8D.

Figure 8B:
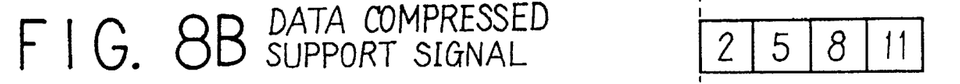
Figure 8C:
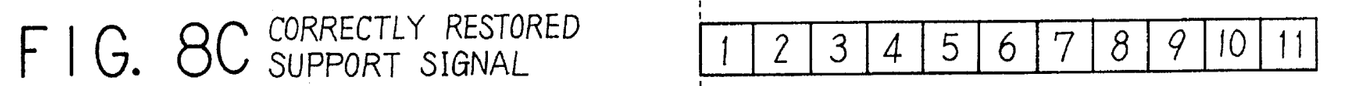
Figure 8D:
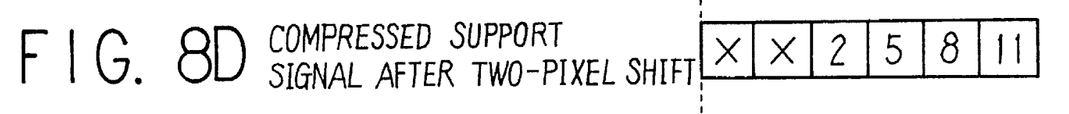
Figure 8E:
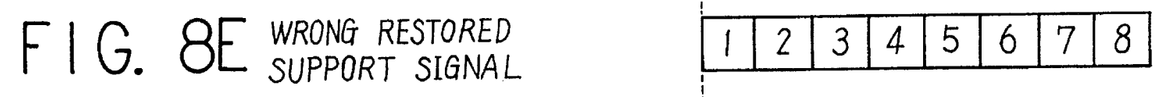
Figure 8F:
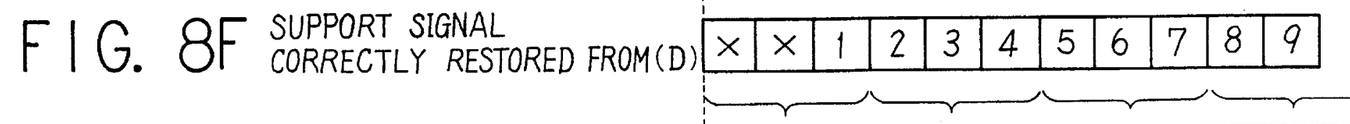

In such a restoring process for the compressed support signal, the first output pixel is processed as the first compressed support signal shown in FIG. 8B and then the signal is restored as shown in FIG. 8E. However, the restoring process should be undertaken with an actual two-pixel shift. The restoring process should be undertaken as shown in FIG. 8F. FIG. 8E represents an incorrect restoring process.

What is desired is a frame synchronizer and a signal switching apparatus that utilizes the frame synchronizer to solve the abovediscussed problems. With such devices the restoring process can be done correctly even if a high definition television signal, such as EDTV-II signal, is applied as the external television signal.

SUMMARY OF THE INVENTION

In order to solve the problems discussed above, the frame synchronizer of the invention synchronizes the frame from an external television signal with that of a local television signal even if a wide screen oriented high definition television signal is used as the external television signal. The image quality of the high definition television signal is improved by adding a support signal to the main screen signal. A memory is provided to receive and store the external television signal. The external television signal is read from the memory after a predetermined pause so that there is at least one frame difference between the external television signal and the local television signal. In this instance, a low pass filter process is applied only to the support signal in the external television signal read from the memory.

The signal switching apparatus of the invention comprises a switching means for receiving multiple local television signals and an external television signal, a frame synchronizer provided in the transmission path of the external television signal, and control means for controlling the switching means and the frame synchronizer. The external television signal is a wide screen oriented high definition television signal the image quality of which is improved by adding a support signal to the main screen signal. The frame synchronizer includes a memory to receive and store the external television signal. The stored external television signal is read from the memory after a predetermined pause so that there is at least one frame difference between the external television signal and the local television signal. In this instance, a low pass filter processes only the support signal in the external television signal read out from the memory.

In the restoring process for the compressed support signal shown in FIG. 8, the first output pixel should be processed as the first compressed support signal as shown in FIG. 8B and this process should be completed under the two-pixel shift condition. Thus, the signal would be restored as shown in FIG. 8F.

Figure 1:
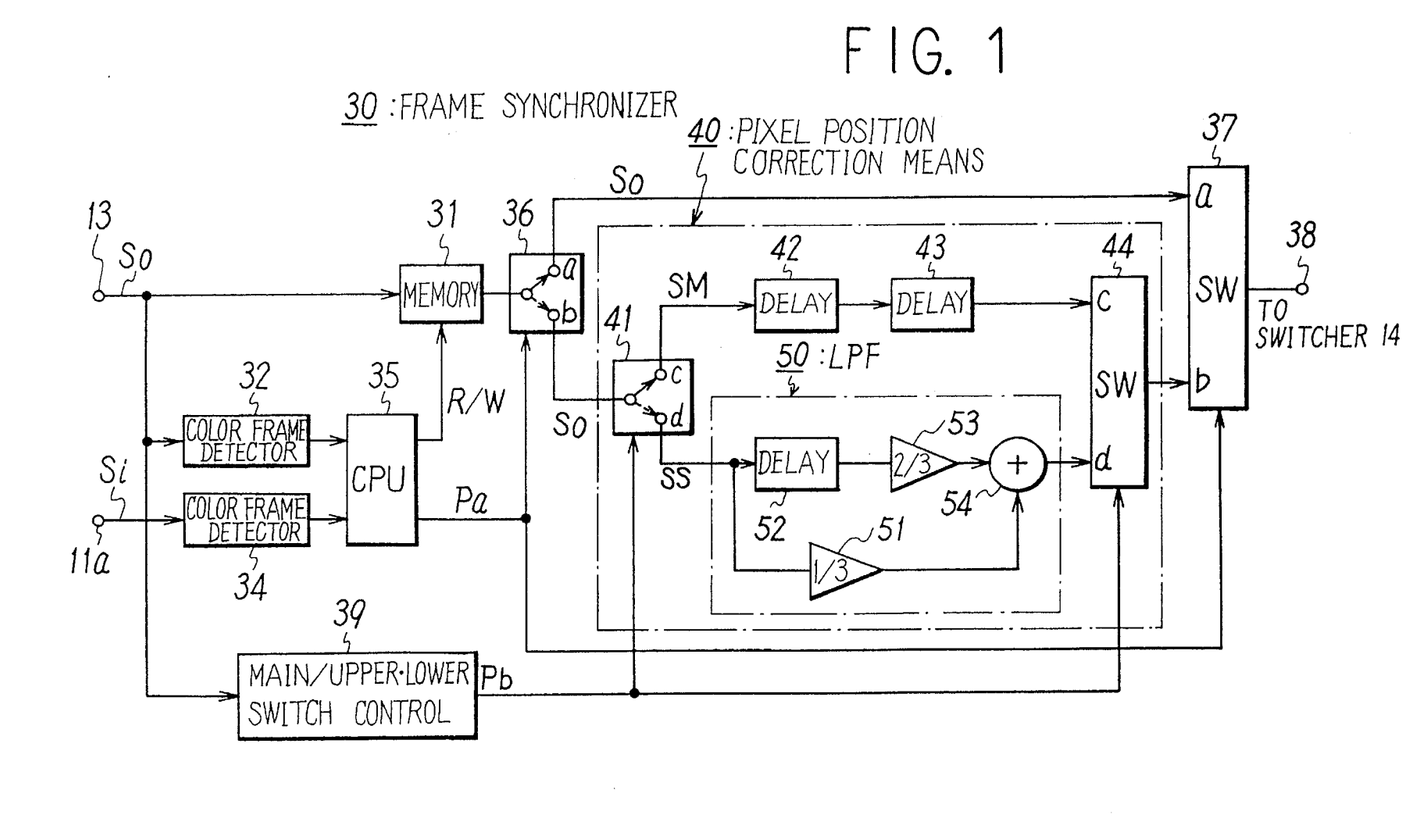
FIG. 1 is a block diagram of one embodiment of a frame synchronizer used in a signal switching apparatus according the present invention.
Figure 3:
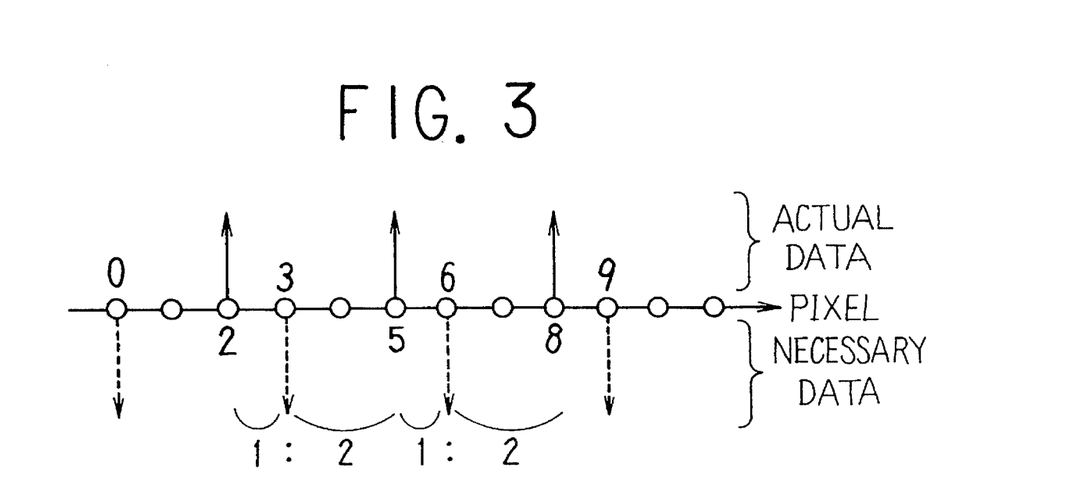
FIG. 3 is a drawing of pixel positions for explaining the restoring of a support signal.
Figure 8G:
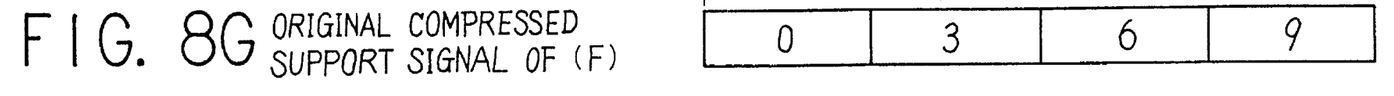

The support signal shown in FIG. 8F can be restored from the compressed support signal shown in FIG. 8G (the pixel position is shown by dotted lines in FIG. 3). The compressed support signal shown by the dotted lines may be restored with a filter process by using the compressed support signal of FIG. 8D. For this purpose, the pixel position should be corrected. Thus, only the support signal is filter processed by a low pass filter 50 as shown in FIG. 1.

The subject matter of the present invention is particularly pointed out and distinctly claimed in the concluding portion of this specification. However, both the organization and method of operation, together with further advantages and objects thereof, may best be understood by reference to the following description in conjunction with the accompanying drawings wherein like reference characters refer to like elements.

DETAILED DESCRIPTION OF THE INVENTION

A preferred embodiment of the frame synchronizer and the signal switching apparatus according to this invention will be described in detail by reference to drawings in which the invention is applied to a video processing apparatus for EDTV-II.

In this invention, the signal switching apparatus 10 of FIG. 5 is used for the local television signal switching operation and the switching operation between the local television signal and the external television signal transmitted from outside the local station maintaining the color frame synchronization between the two in a fashion similar to the prior art.

FIG. 1 shows a block diagram of the frame synchronizer according to this invention. This is used as the frame synchronizer 30 in the signal switching apparatus 10.

An external television signal So applied to the terminal 13 may be a television signal of the present system or the above-discussed high definition television signal having a support signal. In this embodiment, only the latter television signal is applied for simplifying the explanation. This television signal is already converted into a digital form as previously discussed.

The external television signal is applied from the terminal 13 to the memory 31. By using this memory 31, a reading and writing operation (delay process) is done by maintaining the readout timing of the frame synchronization. Such a delay process is undertaken only if the frame difference between the local and external television signals is larger than a predetermined frame number. A color frame detector 32 detects the color frame from the external television signal and the output from the detector 32 is applied to a CPU 35.

A local television signal Si is applied to a terminal 11a simultaneously with the external television signal. The local television signal Si is applied to a color frame detector 34 to detect the color frame from the signal Si. The detected local color frame signal is applied to the CPU 35 which obtains a frame difference between the external and local television signals by comparing both frame signals. The color frame detector 34 is used to detect the local color frame signal, however, this signal may be derived from a local clock source.

If the frame difference between the local and external television signals is within one frame (two fields), the color frame synchronization process may not be necessary. In this instance, the external television signal stored in the memory 31 is read out in accordance with a readout clock RCK that is synchronized with the local frame. The readout signal is applied to an output terminal 38 through a first switch 36 and a second switch 37 without any processing. The CPU 35 produces a switch control pulse Pa for the switches 36 and 37. The switching devices, including the first switch 31, may be electrical switches, such as transistors or the like.

When the difference between the local and external frames is larger than one frame, the external television signal stored in the memory 31 is read out so that the delay value is two fields plus two pixels. Thus, this delay process can establish the previously discussed color frame synchronization process. In this instance, both the first and second switches 36 and 37 select contacts b.

Through this switching, a pixel position correction means 40 is inserted between the memory 31 and the output terminal 38. This means 40 operates to correct the support signal.

Figure 2:
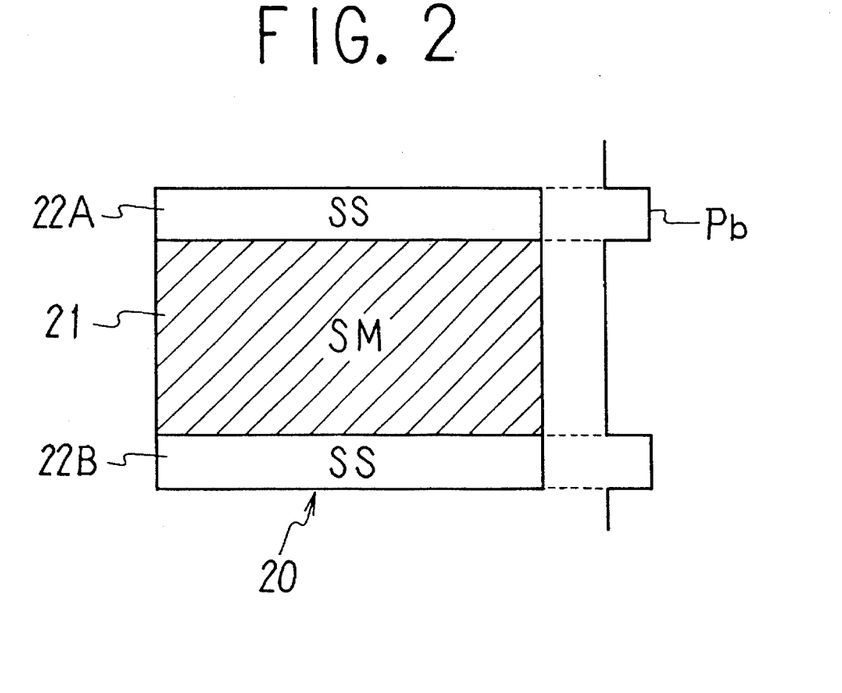
FIG. 2 is a diagram explaining the relationship between a switching pulse and a television signal configuration.

The pixel position correction means 40 includes the third and fourth switches 41 and 44 at the input and output sides. They are controlled in response to a switch pulse Pb that corresponds to the support signal as shown in FIG. 2. A generation circuit 39 generates this switch pulse Pb. The switches 41 and 44 are switched to the contacts c when the scanning position is in the main screen area 21 and they are switched to the contacts d when the scanning position is in the upper and lower blank areas 22A and 22B.

When the scanning position is in the main screen area 21, the television signal from the memory 31 is not specially processed but is only delayed by delay devices 42 and 43 that are inserted between the switches 41 and 44. The total delay time adjustment for the delay devices 42 and 43 is set to one pixel time. A low pass filter (LPF) 50 is provided between the contacts d of the switches 41 and 44. Since this low pass filter 50 is used to correct the pixel position, the television signal from the memory 31 is applied to this filter 50 by the switches 41 and 44 when the scanning position is in the upper and lower blank areas 22A and 22B. The low pass filter 50 may be a digital low pass filter and FIG. 1 shows the simplest configuration thereof.

The pixel position is corrected by the low pass filter 50 as follows: FIG. 8D shows the compressed support signal after the signal is shifted by two pixels. If the horizontal axis of FIG. 8 represents the pixel position, the readout compressed support signal shown in FIG. 8D may be represented by the continuous arrows in FIG. 3. In other words, the signal in FIG. 8D is positioned at the pixel positions 2, 5, 8, and so on.

FIG. 8F shows the support signal correctly restored from the compressed support signal that is shifted by two pixels. The restored support signal of FIG. 8F is equivalent to one that is restored from the compressed support signal of FIG. 8G.

It is necessary to restore the compressed support signal correctly after shifting it by two pixels as shown in FIG. 8F. For this purpose, the compressed support signal may be corrected such that the pixel position of the compressed support signal matches the pixel positions 0, 3, 6, 9, and so on as shown by the dotted lines in FIG. 3. For example, this position correction can be established by a linear interpolation. In the example shown, the compressed support signal at the dotted line positions is obtained by interpolating the compressed support signal (shown by the continuous arrow positions) with a ratio of 1:2.

This process may be completed by the low pass filter 50 shown in FIG. 1. A delay device 52 applies the one-pixel delay to the signal from the memory 31. A coefficient device 51 is a multiplier for multiplying the original support signal by the coefficient ⅓ or weighting this signal ⅓. A coefficient device 53 weights the delayed support signal from the delay device 52 by ⅔. The outputs from the coefficient devices 51 and 53 are combined by an adder 54. These weighting and combination processes correct the pixel position of the original support signal to the dotted line positions of FIG. 3. It is well known that if the sum of the weighting coefficients is one in the digital filtering process, this process is known as the low pass filter process.

The compressed support signal from the low pass filter 50 is applied through the fourth switch 44 to the second switch 37. Thus, the output terminal 38 produces the external television signal So that is color frame synchronized and correctly pixel shifted.

Figure 4:
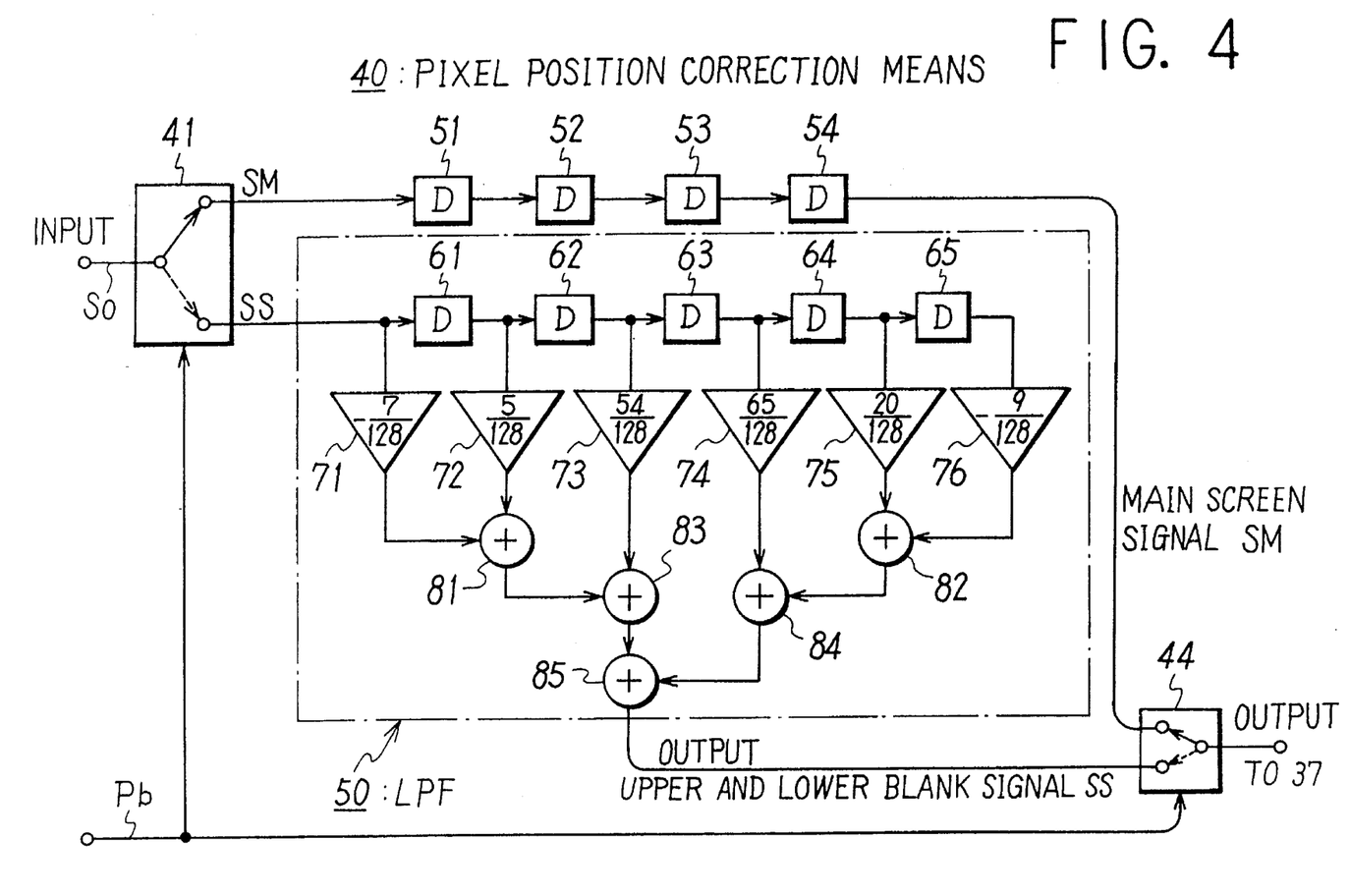
FIG. 4 is a block diagram of another embodiment of a digital low pass filter used in the frame synchronizer of this invention.

FIG. 4 shows another embodiment of the pixel position correction means 40. In this embodiment, the digital low pass filter 50 includes five delay devices 61–65 connected in series to receive the output from the switch 41 and six coefficient devices 71–76 connected to receive the inputs or outputs of the devices 61–65. A delay time for each of the delay devices corresponds to one pixel time and the number of the coefficient devices is determined by the number of the delay devices. The weighting coefficient and polarity of each of the coefficient devices are set as shown in FIG. 4. The outputs from the coefficient devices are applied to an adder 85 through four adders 81–84 to combine all the outputs from the devices 71–76. The final output from the adder 85 is applied to the switch 44.

The output from the adder 85 is the compressed support signal having the corrected pixel positions. Four stages of delay devices 51–54 are provided in the transmission path of the main screen signal SM in order to match the delay time of the signal SM with that of the compressed support signal SS.

When the digital low pass filter 50 comprises many coefficient devices, it is possible to restore the support signal having a level similar to the original one after correcting the pixel position. The digital low pass filter 50 may be established by many kinds of circuits, including those represented in the embodiments.

In the digital low pass filter 50 of FIG. 4, if the output point of the delay device 62 is selected as a time reference point and the sampling clock frequency is 4 fsc, this digital low pass filter 50 can produce the two-pixel delay by itself because of the delay devices 61 and 62. Thus, it is not necessary to shift the external television signal stored in the memory by two pixels in the readout operation.

As will be understood from the foregoing description, with the frame synchronizer of this invention, even if the external television signal is a high definition television signal including a support signal and the like, its color frame can be synchronized with the local color frame so that the timing gap between the video and audio signals is kept to a minimum. A timing gap between the support signal and the main screen signal may occur when the color frame of the external television signal is synchronized with that of the local television signal, but such a timing gap can be compensated for easily.

When the signal switching apparatus using this frame synchronizer is installed in a local station, it can match the frame timing of many television sources using different television systems together without any problems. Therefore, the present invention is appropriate for a local broadcasting station using EDTV-II.

While I have been herein described the preferred embodiments of the present invention, it will be apparent to those skilled in the art that many changes and modifications may be made without departing from the present invention in its broader aspects. Therefore, the scope of the present invention should be determined only by the following claims.

I claim:

1. A frame synchronizer for receiving an external television signal composed of frames and a local television signal composed of frames and at least approximately synchronizing a frame of the external television signal with a frame of the local television signal, wherein the external television signal is a wide screen oriented high definition television signal having a main screen signal and a support signal for improving image quality of the high definition television signal, said frame synchronizer comprising:

a memory, a read/write control means for detecting frame difference between the external television signal and the local television signal and for writing the external television signal into the memory and reading the external television signal from the memory after a predetermined delay that depends on said frame difference, and a low pass filter that receives the support signal that is read out from the memory when the frame difference is at least one frame.

2. A frame synchronizer according to claim 1, wherein the external television signal is a letter box type high definition television signal and the support signal is a data compressed signal.

3. A frame synchronizer according to claim 1, wherein the external television signal is a digital television signal and the low pass filter is a digital low pass filter.

4. A frame synchronizer according to claim 3, wherein the digital low pass filter comprises:

a delay device having a delay time of one pixel, the delay device receiving the support signal from the memory as a non-delayed signal and providing a delayed signal, a first coefficient device for applying a first weighting coefficient to the delayed signal and providing a first product signal, a second coefficient device for applying a weighting coefficient to the non-delayed signal and providing a second product signal, and an adder for adding the first and second product signals.

5. A frame synchronizer according to claim 3, wherein the digital low pass filter comprises:

first through fifth delay devices each having a delay time of one pixel, the first through fifth delay devices being connected in series and the first delay device receiving the support signal from the memory as a non-delayed signal and the first through fifth delay devices providing respective output signals, first through fifth coefficient devices for applying predetermined weighting coefficients to the output signals of the first through fifth delay devices respectively and providing first through fifth product signals, a sixth coefficient device for applying a weighting coefficient to the non-delayed signal and providing a sixth product signal, and a summation means for adding the first through sixth product signals.

6. A frame synchronizer according to claim 1, comprising a first switch means connected to receive the external television signal read from the memory and direct the external television signal either to a first path or to a second path depending on whether the frame difference is less than one frame or at least one frame, a second switch means connected to select either the first path or the second path and connect the selected path to an output terminal, the second switch means selecting the first path or the second path depending on whether the frame difference is less than one frame or at least one frame, and wherein the second path includes the low pass filter.

7. A frame synchronizer according to claim 6, comprising a third switch means for receiving the external television signal from the memory when the frame difference is at least one frame, a switch control means for controlling the third switch means to direct the external television signal to a first branch of the second path during a main screen signal interval and to a second branch of the second path during a support signal interval, and a fourth switch means responsive to the switch control means for selecting the first branch during the main screen signal interval and the second branch during the support signal interval, and wherein the second branch includes the low pass filter.

8. A frame synchronizer according to claim 1, comprising a first switch means for receiving the external television signal from the memory when the frame difference is at least one frame, a switch control means for controlling the first switch means to direct the external television signal to a first path during a main screen signal interval and to a second path, which includes the low pass filter, during a support signal interval, and a second switch means responsive to the switch control means for selecting the first path during the main screen signal interval and the second path during the support signal interval.

9. A method for at least approximately synchronizing an external television signal composed of frames with a local television signal composed of frames, wherein the external television signal is a wide screen oriented high definition television signal having a main screen signal and a support signal for improving image quality of the high definition television signal, said method comprising:

detecting frame difference between the external television signal and the local television signal, writing the external television signal into a memory, reading the external television signal from the memory after a predetermined delay that depends on said frame difference, and if the frame difference is at least one frame, separating the support signal read from the memory from the main screen signal, low pass filtering the support signal, and combining the low-pass filtered support signal with the main screen signal.

10. A method according to claim 9, wherein the external television signal is a letter box type high definition television signal and the support signal is a data compressed signal.

11. A method according to claim 9, wherein the external television signal is a digital television signal.

12. A method according to claim 11, wherein the step of low pass filtering the support signal comprises, for each pixel value, multiplying a current pixel value by a first weighting coefficient and providing a first product value, multiplying a succeeding pixel value by a second weighting coefficient to provide a second product value, and summing the product values to provide an output pixel value.

13. A method according to claim 11, wherein the step of low pass filtering the support signal comprises receiving a sequence of input pixel values, multiplying first through sixth successive input pixel values by predetermined weighting coefficients to provide first through sixth product values, and summing the first through sixth product values to provide an output pixel value.

14. A method according to claim 9, comprising switching the external television signal read from the memory to a first path if the frame difference is less than one frame and switching the external television signal read from the memory to a second path if the frame difference is at least one frame, and wherein the second path includes a low pass filter for filtering the support signal.

15. A method according to claim 14, wherein if the frame difference is at least one frame, the external television signal read from the memory is directed to a first branch during a main screen signal interval and to a second branch during a support signal interval, and wherein the second branch includes the low pass filter.

16. A signal switching apparatus for selecting an output signal from at least one local television signal composed of frames and an external television signal composed of frames, wherein the external television signal is a wide screen oriented high definition television signal having a main screen signal and a support signal for improving image quality of the high definition television signal, said signal switching apparatus comprising:

a switching means having at least one input terminal for receiving the local television signal, at least one additional input terminal, and an output terminal, a frame synchronizer having an input terminal for receiving the external television signal and an output terminal connected to said additional input terminal of the switching means, said frame synchronizer including a memory, a read/write control means for detecting frame difference between the external television signal and the local television signal and for writing the external television signal into the memory and reading the external television signal from the memory after a predetermined delay that depends on said frame difference, and a low pass filter that receives the support signal that is read out from the memory when the frame difference is at least one frame, and a control means for controlling said switching means and said frame synchronizer.

17. A signal switching apparatus according to claim 16, wherein the external television signal is a letter box type high definition television signal and the support signal is a data compressed signal.

18. A signal switching apparatus according to claim 16, wherein the external television signal is a digital television signal and the low pass filter is a digital low pass filter.

19. A signal switching apparatus according to claim 18, wherein the digital low pass filter comprises:

a delay device having a delay time of one pixel, the delay device receiving the support signal from the memory as a non-delayed signal and providing a delayed signal, a first coefficient device for applying a first weighting coefficient to the delayed signal and providing a first product signal, a second coefficient device for applying a weighting coefficient to the non-delayed signal and providing a second product signal, and an adder for adding the first and second product signals.

20. A signal switching apparatus according to claim 18, wherein the digital low pass filter comprises:

first through fifth delay devices each having a delay time of one pixel, the first through fifth delay devices being connected in series and the first delay device receiving the support signal from the memory as a non-delayed signal and the first through fifth delay devices providing respective output signals, first through fifth coefficient devices for applying predetermined weighting coefficients to the output signals of the first through fifth delay devices respectively and providing first through fifth product signals, a sixth coefficient device for applying a weighting coefficient to the non-delayed signal and providing a sixth product signal, and a summation means for adding the first through sixth product signals.

21. A signal switching apparatus to claim 16, wherein the frame synchronizer comprises a first switch means connected to receive the external television signal read from the memory and direct the external television signal either to a first path or to a second path depending on whether the frame difference is less than one frame or at least one frame, a second switch means connected to select either the first path or the second path and connect the selected path to an output terminal, the second switch means selecting the first path or the second path depending on whether the frame difference is less than one frame or at least one frame, and wherein the second path includes the low pass filter.

22. A signal switching apparatus according to claim 21, wherein the frame synchronizer comprises a third switch means for receiving the external television signal from the memory when the frame difference is at least one frame, a switch control means for controlling the third switch means to direct the external television signal to a first branch of the second path during a main screen signal interval and to a second branch of the second path during a support signal interval, and a fourth switch means responsive to the switch control means for selecting the first branch during the main screen signal interval and the second branch during the support signal interval, and wherein the second branch includes the low pass filter.

23. A signal switching apparatus according to claim 16, comprising a first switch means for receiving the external television signal from the memory when the frame difference is at least one frame, a switch control means for controlling the first switch means to direct the external television signal to a first path during a main screen signal interval and to a second path, which includes the low pass filter, during a support signal interval, and a second switch means responsive to the switch control means for selecting the first path during the main screen signal interval and the second path during the support signal interval.

24. A frame synchronizer for receiving an external color television signal composed of frames and a local color television signal composed of frames and at least approximately synchronizing a color frame of the external television signal with a color frame of the local television signal, wherein the external television signal is a wide screen oriented high definition television signal having a main screen signal and a support signal for improving image quality of the high definition television signal, said frame synchronizer comprising:

a memory, a read/write control means for detecting color frame difference between the external television signal and the local television signal and for writing the external television signal into the memory and reading the external television signal from the memory after a predetermined delay that depends on said color frame difference, and a low pass filter that receives the support signal that is read out from the memory when the color frame difference is at least one frame.

25. A method for at least approximately synchronizing an external color television signal composed of frames with a local color television signal composed of frames, wherein the external television signal is a wide screen oriented high definition television signal having a main screen signal and a support signal for improving image quality of the high definition television signal, said method comprising:

detecting color frame difference between the external television signal and the local television signal, writing the external television signal into a memory, reading the external television signal from the memory after a predetermined delay that depends on said color frame difference, and if the color frame difference is at least one frame, separating the support signal read from the memory from the main screen signal, low pass filtering the support signal, and combining the low-pass filtered support signal with the main screen signal.

26. A signal switching apparatus for selecting an output signal from at least one local color television signal composed of frames and an external color television signal composed of frames, wherein the external television signal is a wide screen oriented high definition television signal having a main screen signal and a support signal for improving image quality of the high definition television signal, said signal switching apparatus comprising:

a switching means having at least one input terminal for receiving the local television signal, at least one additional input terminal, and an output terminal, a frame synchronizer having an input terminal for receiving the external television signal and an output terminal connected to said additional input terminal of the switching means, said frame synchronizer including a memory, a read/write control means for detecting color frame difference between the external television signal and the local television signal and for writing the external television signal into the memory and reading the external television signal from the memory after a predetermined delay that depends on said color frame difference, and a low pass filter that receives the support signal that is read out from the memory when the color frame difference is at least one frame, and a control means for controlling said switching means and said frame synchronizer.

* * * * *